(12) United States Patent
Schulte

(10) Patent No.: US 10,351,179 B2
(45) Date of Patent: Jul. 16, 2019

(54) DUAL CONFIGURATION AUTOMOBILE FLOOR ASSEMBLY

(71) Applicant: Matt J Schulte, Marine City, MI (US)

(72) Inventor: Matt J Schulte, Marine City, MI (US)

( * ) Notice: Subject to any disclaimer, the term of this patent is extended or adjusted under 35 U.S.C. 154(b) by 19 days.

(21) Appl. No.: 15/689,030

(22) Filed: Aug. 29, 2017

(65) Prior Publication Data

US 2019/0061831 A1 Feb. 28, 2019

(51) Int. Cl.
*B62D 25/20* (2006.01)
*B62D 27/06* (2006.01)
*B62D 29/00* (2006.01)
*F16L 33/22* (2006.01)

(52) U.S. Cl.
CPC .............. *B62D 25/20* (2013.01); *B62D 27/06* (2013.01); *B62D 29/00* (2013.01); *F16L 33/225* (2013.01)

(58) Field of Classification Search
CPC ............................ B62D 25/20; B62D 25/2009; B62D 25/2027; B62D 27/06; B62D 29/00; F16L 33/225
USPC ....................................................... 180/65.21
See application file for complete search history.

(56) References Cited

U.S. PATENT DOCUMENTS

| | | | | |
|---|---|---|---|---|
| 4,615,546 A | * | 10/1986 | Nash | F16L 37/23 285/26 |
| 4,709,124 A | | 11/1987 | Wheeler et al. | |
| 4,900,065 A | * | 2/1990 | Houck | F16L 37/098 285/124.4 |
| 5,653,475 A | | 8/1997 | Scheyhing et al. | |
| 6,672,628 B2 | | 1/2004 | Thomas et al. | |
| 9,796,293 B2 | * | 10/2017 | Ito | B60L 11/1877 |
| 2014/0252763 A1 | | 9/2014 | Flessa et al. | |

FOREIGN PATENT DOCUMENTS

| | | |
|---|---|---|
| EP | 2602141 A1 | 6/2013 |
| EP | 2787572 A1 | 10/2014 |
| EP | 2985560 A1 | 2/2016 |

OTHER PUBLICATIONS

2015 BYD Tang Hybrid Electric SUV (2015).
(Continued)

*Primary Examiner* — John D Walters
(74) *Attorney, Agent, or Firm* — Ralph E. Smith

(57) ABSTRACT

A hybrid electric vehicle configuration of the dual configuration floor assembly includes a single-piece integrally-molded thermoplastic coupling seal plate having an interior and exterior side and including: (1) a coolant delivery passage extending through coupling seal plate and having an interior and an exterior quick-connect coolant delivery coupling at respective ends of the coolant delivery passage; (2) a coolant return passage extending through the coupling seal plate with an interior and an exterior quick-conned coolant return coupling at respective ends of the coolant return passage; (3) an electrical harness opening through the coupling seal plate; and (4) floor-plate coupling elements. A non-hybrid electric vehicle configuration of the dual configuration floor assembly includes an operating unit and an operating unit gasket positioned around an interior side of the floor opening between the operating unit and the sheet metal floor component.

12 Claims, 10 Drawing Sheets

(56) References Cited

OTHER PUBLICATIONS

Aqua EZ Plastic Vacuum Plate; https://www.lowes.com/pd/Aqua-EZ-Plastic-Vacuum-plate/3027674; downloaded from Internet Jul. 6, 2017.
ATL, Introductory Fuel Cell Design Guide; Aero Tec Laboratories Inc.; http://atlinc.com/pdfs/Racing/ATL-Design-Guide-8×14-FINAL-WEB.pdf; downloaded from Internet Jul. 6, 2017.
Aspria Systems Central Vacuum Blog; "Central Vacuum Hoses & Inlets Explained"; www.centralvacuumsystems.com/knowledge_base/central_vacuum_hose_inlets/; posted Jan. 20, 2014.
MTS Products Corp.; Inside Vented Battery Box; http://www.mtsproducts.com/m/products/inside-battery-box-topvent/; downloaded from Internet Jul. 6, 2017.
Waterway Vac Plate W/90 Degree; Poolpartsonline.com; https://www.poolpartsonline.com/p-51518-vac-plate-w-90-degree-519-3150-opt-4095-01.aspx; downloaded from Internet Jul. 6, 2017.
NORMA Group PS3 VDA Quick Connectors; http://www.normagroup.com/corp/en/NORMA-QUICK-PS3; downloaded from Internet Jul. 6, 2017.
AutoZone Repair Guides, Emissions Controls, Evaporative Emission Control System; http://www.autozone.com/repairguides/GM-Bonneville-Eighty-Eight-LeSabre-1986-1999/EMISSION-CONTROLS/Evaporative-Emission-Control-System/_/P-0996b43f8038fad3; downlownded from Internet Jul. 6, 2017.
International Search Report and Written Opinion dated Dec. 20, 2018 for International Application No. PCT/US2018/048337, International Filing Date Aug. 28, 2018.

\* cited by examiner

DUAL CONFIGURATION AUTOMOBILE FLOOR ASSEMBLY

FIELD

The present disclosure relates to a dual configuration automobile floor assembly.

BACKGROUND

Automobiles sometimes come in multiple configurations that require two or more versions of primary components of the automobile. Such primary components include the frame and floor components of the automobile. Due to the structural nature and size of such primary or foundational components, designing, manufacturing, and inventorying multiple versions of primary, foundational components, e.g., floor components, typically results in significant incremental costs.

Nevertheless, such incremental costs related to such primary or foundational components are often considered a necessary evil of offering substantially different configurations of the same model automobile. For example, in a non-hybrid electric version of one model automobile, a third row passenger seat is often mounted to a rear floor component with an adjacent rear HVAC unit. In a hybrid electric version, however, a hybrid electric battery is coupled, directly or indirectly, to the rear floor component in place of the third row passenger seat.

SUMMARY

In accordance with an aspect of the present disclosure, a dual configuration automobile floor assembly includes a sheet metal floor component separating an exterior underbody of the automobile from the interior cabin of the automobile and has a floor opening extending between the exterior underbody and the interior cabin. A hybrid electric vehicle configuration of the dual configuration floor assembly includes a single-piece integrally-molded thermoplastic coupling seal plate having an interior and exterior side and including: (1) a coolant delivery passage extending through coupling seal plate and having an interior and an exterior quick-connect coolant delivery coupling at respective ends of the coolant delivery passage; (2) a coolant return passage extending through the coupling seal plate with an interior and an exterior quick-connect coolant return coupling at respective ends of the coolant return passage; (3) an electrical harness opening through the coupling seal plate; and (4) floor-plate coupling elements. In addition, a plate gasket is positioned around an interior side of the floor opening between the single-piece integrally-molded thermoplastic coupling seal plate and the sheet metal floor component. The coupling seal plate is mounted to the sheet metal floor component in the hybrid electric vehicle configuration via the floor-plate coupling elements and is sealed around the floor opening via the plate gasket. A non-hybrid electric vehicle configuration of the dual configuration floor assembly includes an operating unit and an operating unit gasket positioned around an interior side of the floor opening between the operating unit and the sheet metal floor component. The operating unit is mounted on the sheet metal floor component in the non-hybrid electric vehicle configuration and is sealed around the floor opening via the operating unit gasket.

In another aspect, the hybrid electric vehicle configuration additionally includes an electrical harness grommet mounted in and sealing the electrical harness passage with an electrical harness passing therethrough.

In other aspects, the quick connect coolant delivery couplings include coolant delivery key elements comprising delivery recesses, protrusions or both. The quick connect coolant return couplings include coolant return key elements comprising return recesses, protrusions or both. The delivery and return key elements are incompatible, preventing a coolant delivery hose coupling from being coupled to the quick connect coolant return couplings and vice versa.

In other aspects, the hybrid electric vehicle configuration additionally includes an exterior coolant delivery hose that has a cooperating quick connect delivery coupling that is coupled to the exterior quick connect coolant delivery coupling of the coupling seal plate with cooperating coolant delivery key elements matingly engaged with the coolant delivery key elements. An interior coolant delivery hose has a cooperating quick connect delivery coupling that is coupled to the interior quick connect coolant delivery coupling of the coupling seal plate with cooperating coolant delivery key elements matingly engaged with the coolant delivery key elements. An exterior coolant return hose has a cooperating quick connect return coupling that is coupled to the exterior quick connect coolant return coupling of the coupling seal plate with cooperating coolant return key elements matingly engaged with the coolant return key elements. An interior coolant return hose has a cooperating quick connect coupling that is coupled to the interior quick connect coolant return coupling of the coupling seal plate with cooperating coolant return key elements matingly engaged with the coolant return key elements.

In another aspect, the operating unit of the non-hybrid electric vehicle configuration is a rear HVAC unit.

In another aspect, an HVAC coolant delivery coupling and an HVAC coolant return coupling extends through the floor opening from a bottom of the rear HVAC unit in the non-hybrid electric vehicle configuration and coolant is provided to and from the HVAC unit through the floor opening via the HVAC coolant delivery and return couplings, respectively.

In another aspect, a third row passenger seat is mounted to the sheet metal floor component adjacent the floor opening in the non-hybrid electric vehicle configuration.

In another aspect, a hybrid electric vehicle battery is mounted to the sheet metal floor component adjacent the floor opening in the hybrid electric vehicle configuration, and coolant is provided to and from the hybrid electric vehicle battery through the floor opening via the coolant delivery and return passages, respectively, of the coupling seal plate.

In another aspect, the floor-plate coupling elements of the single-piece integrally-molded thermoplastic coupling seal plate comprise a plurality of lateral extensions with fastener apertures extending therethrough. Threaded fasteners extend through the fastener apertures in the hybrid electric vehicle configuration.

In another aspect, the floor-plate coupling elements of the single-piece integrally-molded thermoplastic coupling seal plate comprise flexible thermoplastic clips. The flexible clips engage against the sheet metal floor component to sealingly couple the seal plate to the sheet metal floor component in the hybrid electric vehicle configuration.

In another aspect, the floor-plate coupling elements of the single-piece integrally-molded thermoplastic coupling seal plate comprise ribs. Separate, flexible metal clips are mounted on the ribs that engage against the sheet metal floor component to sealingly couple the seal plate to the sheet metal floor component in the hybrid electric vehicle configuration.

In another aspect, the single-piece integrally-molded thermoplastic coupling seal plate additionally includes a battery vent nipple forming a vent passage through the coupling seal plate.

DRAWINGS

The present invention will become more fully understood from the detailed description and the accompanying drawings.

DETAILED DESCRIPTION

Figure 1:
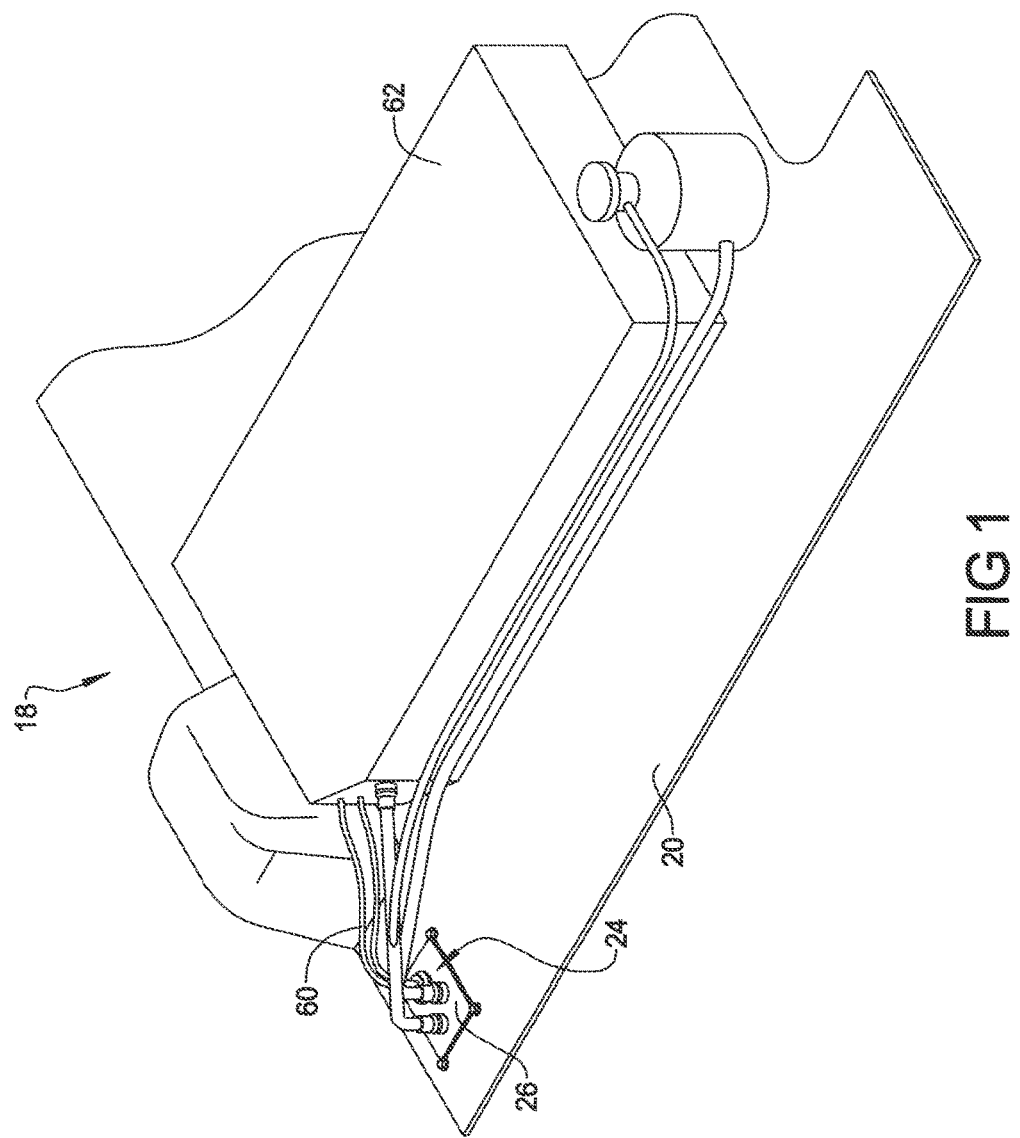
FIG. 1 is a top perspective view of an exemplary automobile floor assembly in a hybrid electric vehicle configuration in accordance with the present disclosure.
Figure 2:
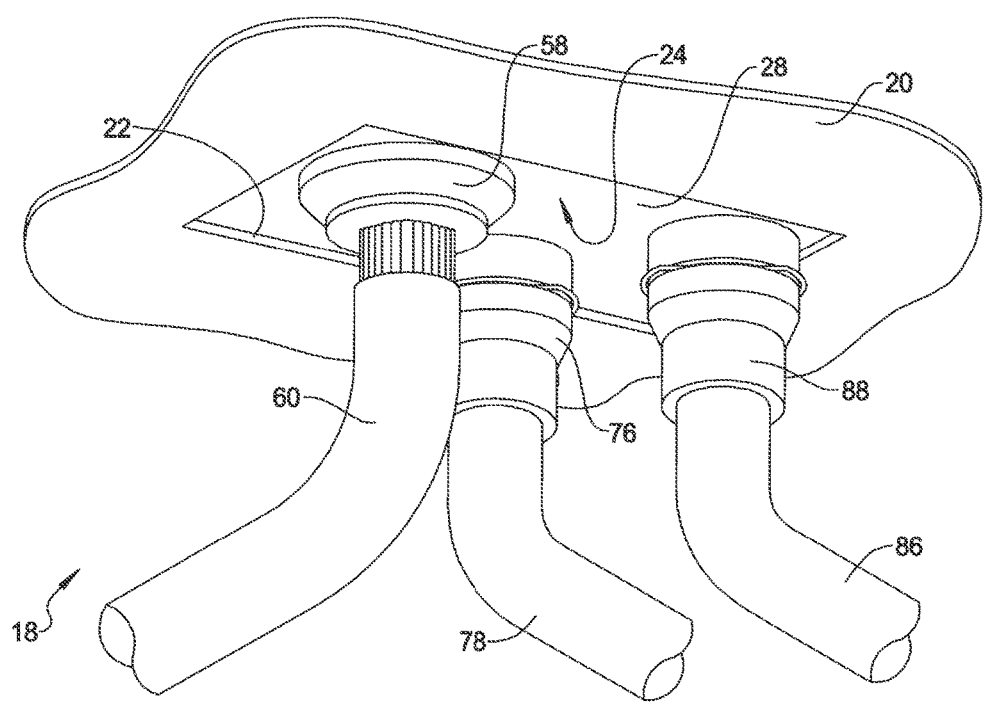
FIG. 2 is a bottom perspective view of the exemplary automobile floor assembly in the hybrid electric vehicle configuration of FIG. 1.
Figure 3:
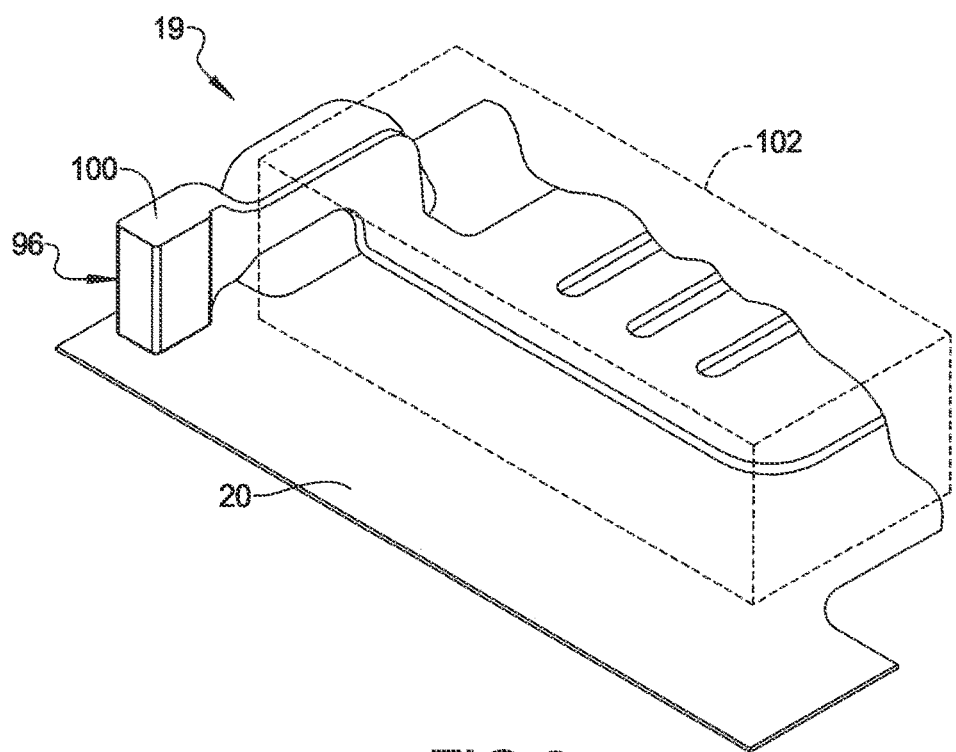
FIG. 3 is a top perspective view of the exemplary automobile floor assembly of FIG. 1 in a non-hybrid electric vehicle configuration in accordance with the present disclosure.
Figure 4:
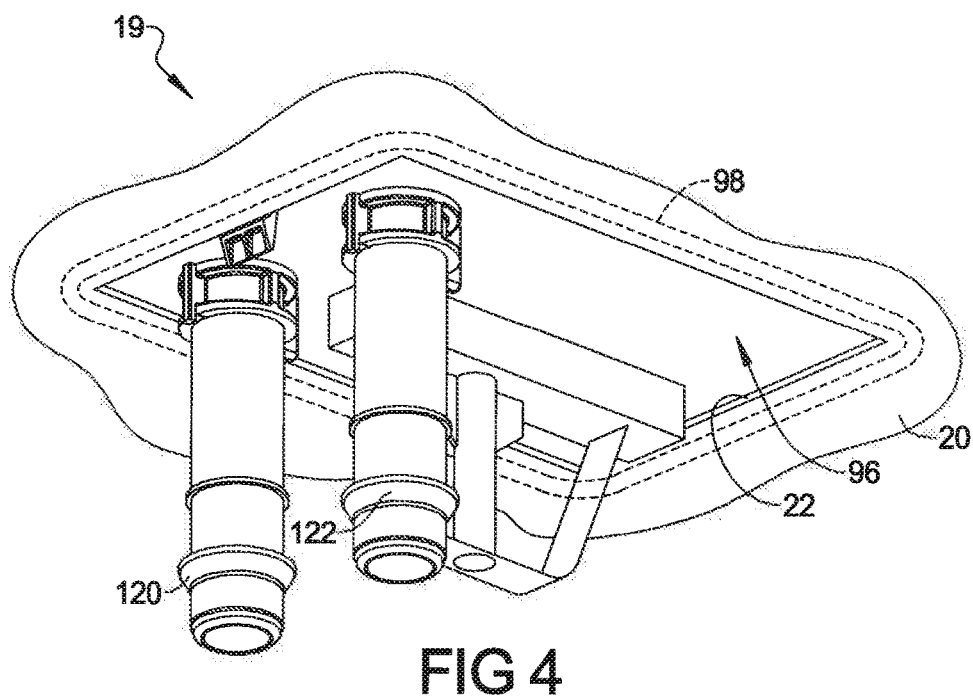
FIG. 4 is a bottom perspective view of the exemplary automobile floor assembly in the hybrid electric vehicle configuration of FIG. 3.
Figure 5:
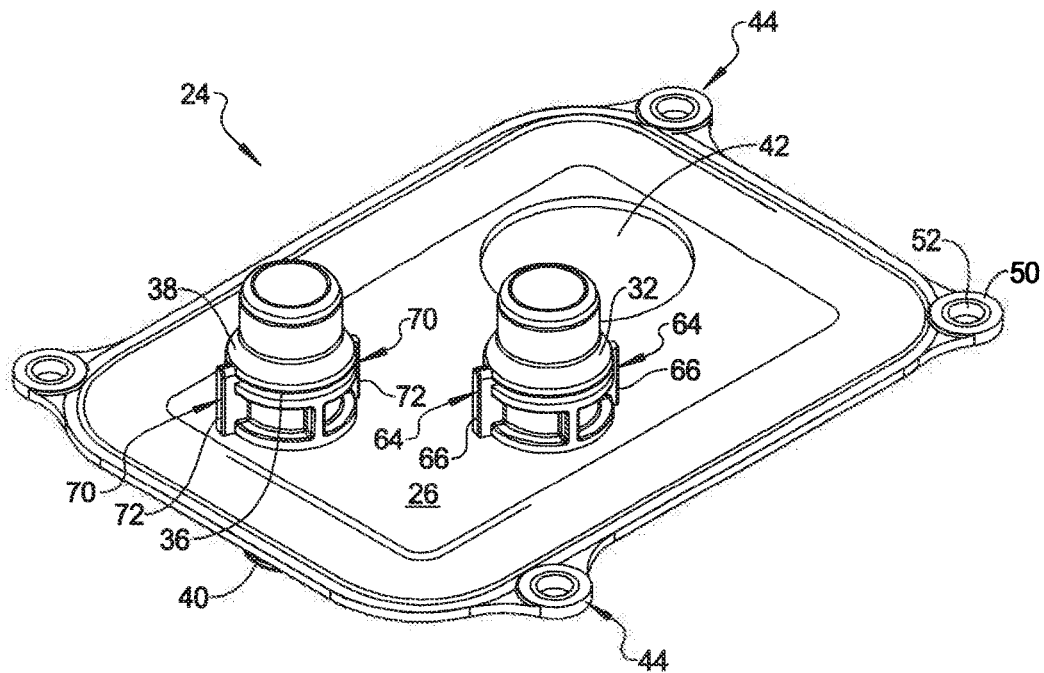
FIG. 5 is a top perspective view of an exemplary single-piece integrally-molded thermoplastic coupling seal plate of the hybrid electric vehicle configuration of FIG. 1.
Figure 6:
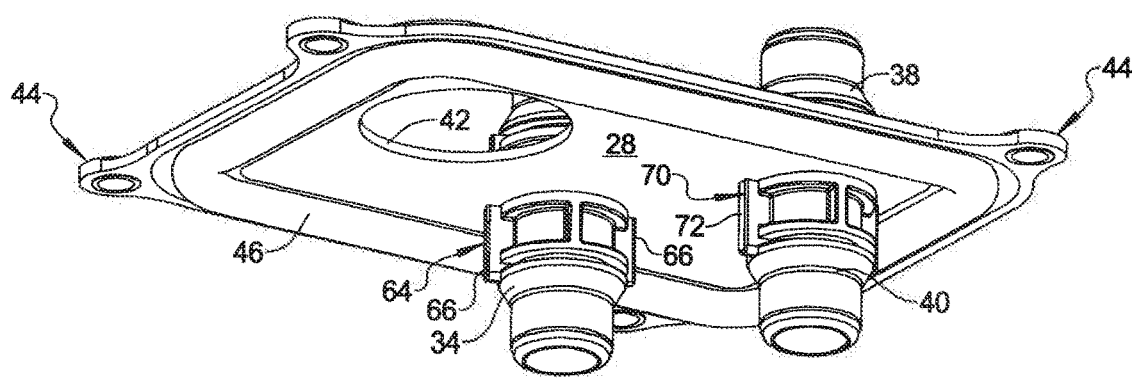
FIG. 6 is a bottom perspective view of the exemplary single-piece integrally-molded thermoplastic coupling seal plate of FIG. 5.
Figure 7:
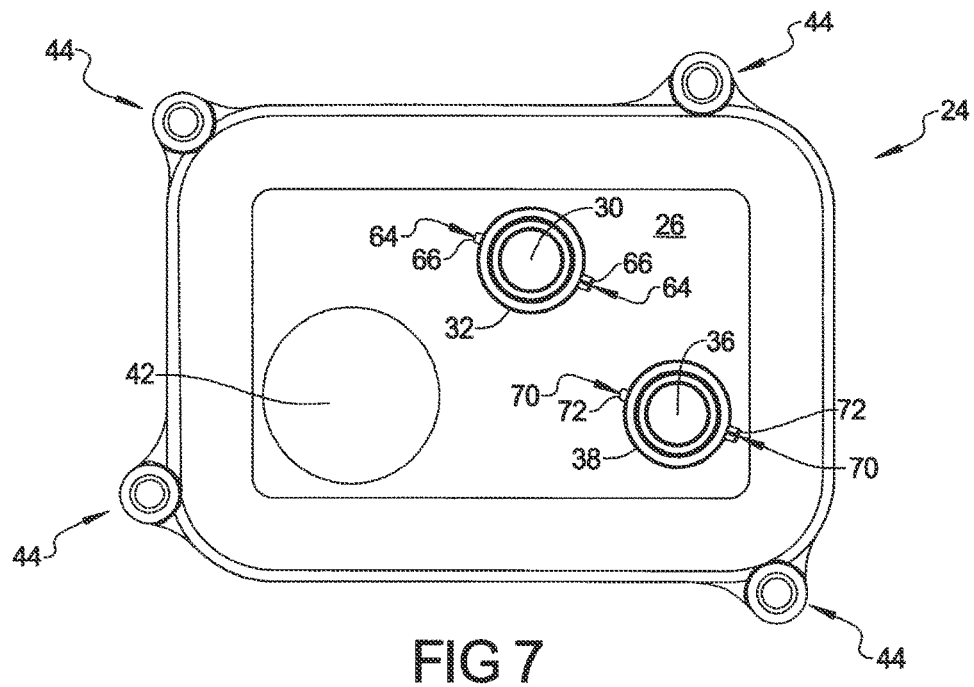
FIG. 7 is a top plan view of the exemplary single-piece integrally-molded thermoplastic coupling seal plate of FIG. 5.
Figure 8:
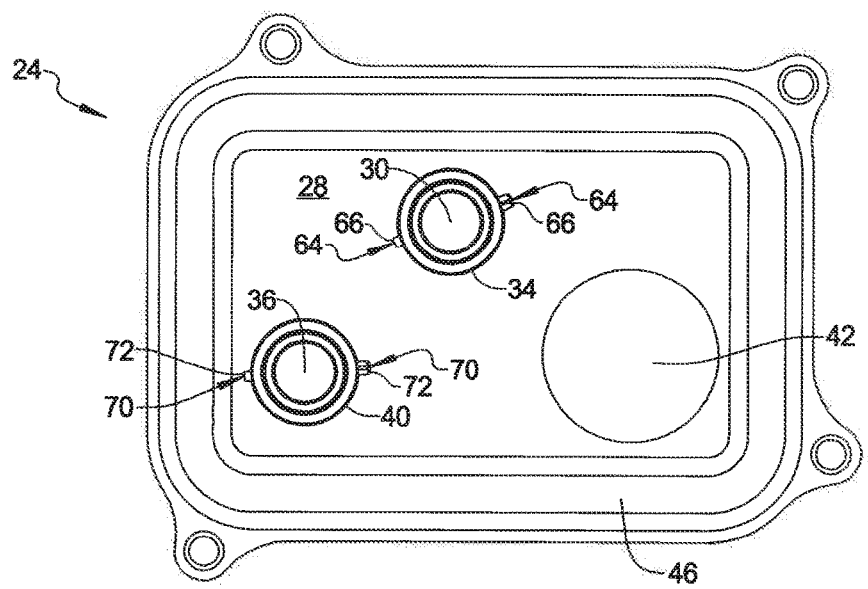
FIG. 8 is a bottom plan view of the exemplary single-piece integrally-molded thermoplastic coupling seal plate and gasket of FIG. 5.
Figure 9:
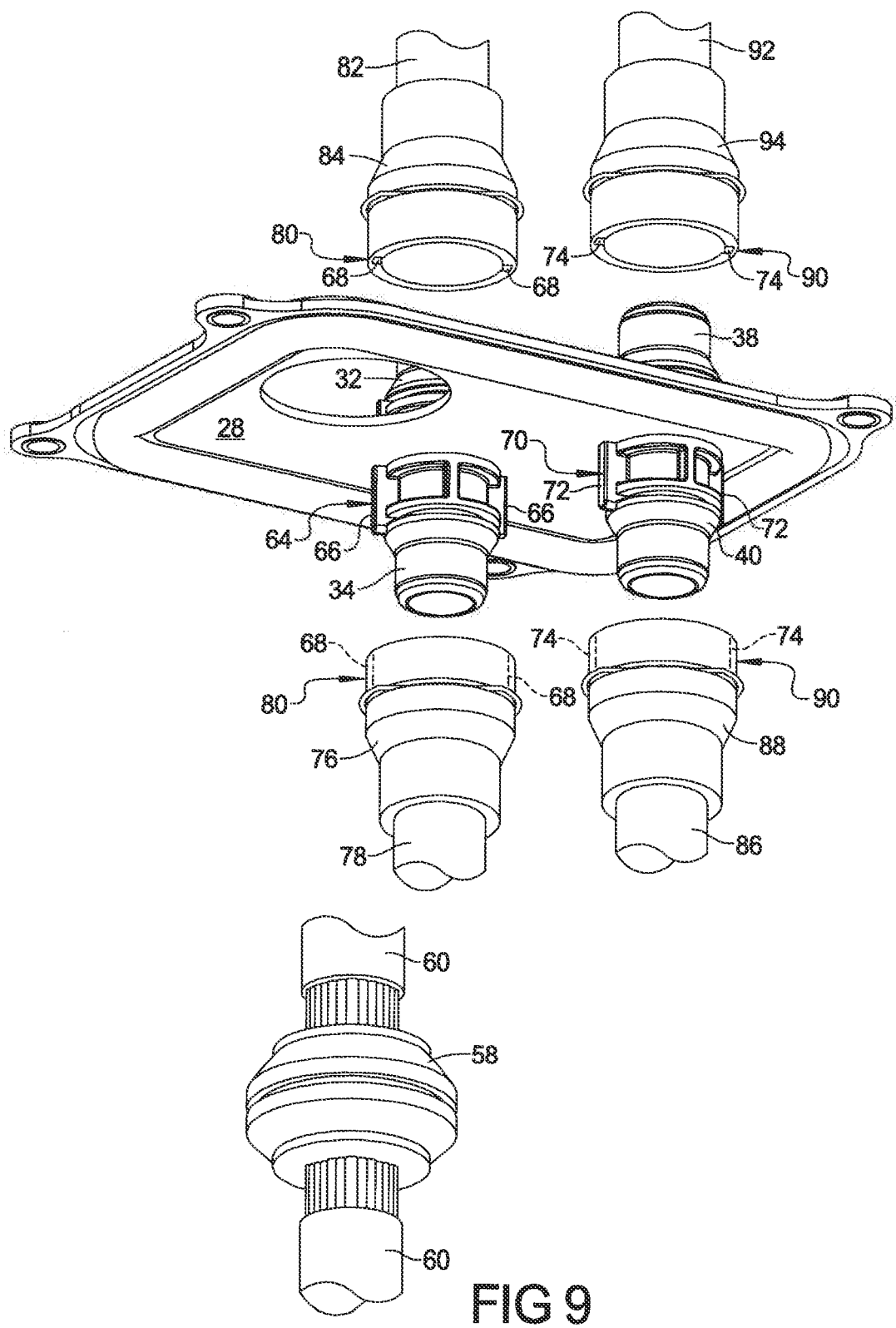
FIG. 9 is a lower perspective exploded view of the exemplary seal plate of FIG. 5 and related components of the hybrid electric vehicle configuration.
Figure 10:
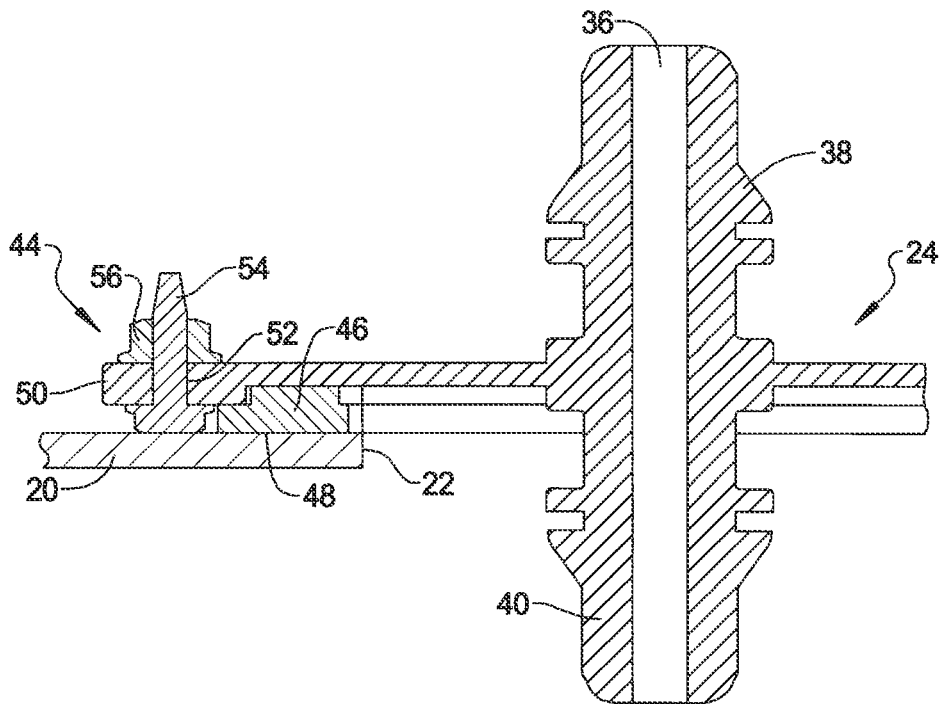
FIG. 10 is a partial cross-sectional view of the exemplary seal plate of FIG. 5 and related coupling components.

Further areas of applicability will become apparent from the description, claims and drawings, wherein like reference numerals refer to like features throughout the several views of the drawings. It should be understood that the detailed description, including disclosed embodiments and drawings referenced therein are merely exemplary in nature, intended for purposes of illustration only, and are not intended to limit the scope of the present disclosure.

FIGS. 1-10 relate to an exemplary embodiment of a dual configuration automobile floor assembly in accordance with an aspect of the present disclosure. A primary or foundational automobile sheet metal floor component 20 separates an exterior underbody of the automobile from the interior cabin of the automobile. This sheet metal floor component 20 has a floor opening 22 extending between the exterior underbody and the interior cabin. A hybrid electric vehicle configuration 18 of the dual configuration assembly is illustrated, for example, in FIGS. 1 and 2. A non-hybrid electric vehicle configuration 19 of the dual configuration assembly is illustrated, for example, in FIGS. 3 and 4.

In the hybrid electric vehicle configuration 18, a single-piece integrally-molded thermoplastic coupling seal plate 24 comprises a substantially planar plate which has an interior side 26 and an exterior side 28. The single-piece integrally-molded thermoplastic coupling seal plate 24 includes each of: (1) a coolant delivery passage 30 extending through coupling seal plate 24 and having an interior quick-connect coolant delivery coupling 32 and an exterior quick-connect coolant delivery coupling 34 at respective ends of the coolant delivery passage 30; (2) a coolant return passage 36 through the coupling seal plate 24 with an interior quick-connect coolant return coupling 38 and an exterior quick-connect coolant return coupling 40 at respective ends of the coolant return passage 36; (3) an electrical harness opening 42 through the coupling seal plate 24; and (4) floor-plate coupling elements 44.

A plate gasket 46 is positioned around an interior side 48 of the floor opening 22 between the single-piece integrally-molded thermoplastic coupling seal plate 24 and the sheet metal floor component 20. In an aspect, the plate gasket 46 is a separate component from that of the seal plate 24. In an alternative aspect, the plate gasket 46 is integrally formed with the seal plate; e.g., in which a softer thermoplastic material of the plate gasket 46 is molded integrally with the remainder of the seal plate 24 in a second shot of a two shot molding process.

The coupling seal plate 24 is mounted to the sheet metal floor component 20 in the hybrid electric vehicle configuration 18 via the floor-plate coupling elements 44 and is sealed around the floor opening 22 via the plate gasket 46. In this embodiment, the floor-plate coupling elements 44 of the single-piece integrally-molded thermoplastic coupling seal plate 24 are a plurality of lateral extensions 50 with fastener apertures 52 extending therethrough. Threaded fasteners 54 extend through the fastener apertures 52, and a threaded nut 56 is used to secure the coupling seal plate 24 to the floor component 20 in the hybrid electric vehicle configuration. In an aspect, the threaded fastener 54 is a weld stud that is welded to the interior surface 48 of the floor component 20. In an alternative aspect, the threaded fastener 54 is a bolt that extends through a fastener aperture (not shown) that extends through the floor component 20.

In this example, the hybrid electric vehicle configuration 18 includes an electrical harness grommet 58 mounted in and sealing the electrical harness passage 42 with an electrical harness 60 passing therethrough. The electrical harness 60 couples a hybrid electric vehicle battery 62 to vehicle drive train components (not shown). The hybrid electric vehicle battery 62 is mounted to the sheet metal floor component 20 adjacent the floor opening 22 in the hybrid electric vehicle configuration 18.

In this example, the quick connect coolant delivery couplings 32, 34 each include coolant delivery key elements 64.

The coolant delivery key elements 64 are delivery protrusions 66, recesses 68, or both. The quick connect coolant return couplings 38, 40 each include coolant return key elements 70. The coolant return key elements 70 are return protrusions 72 recesses 74, or both. The delivery key elements 64 and the return key elements 70 are designed to be incompatible with each other. In other words, they are designed to preventing a corresponding quick connect delivery coupling 76, 84 of a coolant delivery hose 78, 82 from being coupled to a quick connect coolant return coupling 38, 40 of the coupling plate 24, and vice versa. For example, at least one of the type, number, location and size of the return key elements 70 is different from those of the delivery key elements 64.

In an aspect, the hybrid electric vehicle configuration 18 includes an exterior coolant delivery hose 78 having a cooperating quick connect coupling 76. This exterior cooperating quick connect delivery coupling 76 is coupled to the exterior quick connect coolant delivery coupling 34 of the coupling seal plate 24 with cooperating coolant delivery key elements 80 matingly engaged with the coolant delivery key elements 64. Similarly, an interior coolant delivery hose 82 having a cooperating quick connect coupling 84 is coupled to the interior quick connect coolant delivery coupling 32 of the coupling seal plate 24 with the cooperating coolant delivery key elements 80 matingly engaged with the coolant delivery key elements 64. In addition, an exterior and interior coolant return hose, 86 and 92, respectively, each have a cooperating quick connect delivery coupling, 88 and 94, respectively, that is coupled to the exterior and interior quick connect coolant return coupling, 40 and 38, respectively, of the coupling seal plate 24 with the cooperating coolant return key elements 90 matingly engaged with the coolant return key elements 70. Thus, coolant is provided to and from the battery 62 within the interior cabin from a coolant source outside the cabin via the exterior underbody. In an aspect, the various quick connect couplings 32, 34, 38, 40, 76, 84, 88, 94 are VDA quick connectors.

In the non-hybrid electric vehicle configuration 19, the assembly includes an operating unit 96 and an operating unit gasket 98 that is positioned around an interior side 48 of the floor opening 22 between the operating unit 96 and the sheet metal floor component 20. The operating unit 96 is mounted on the sheet metal floor component 20 in the non-hybrid electric vehicle configuration 19 and is sealed around the floor opening 22 via the operating unit gasket 98. In this example, the operating unit 96 of the non-hybrid electric vehicle configuration 19 is a rear HVAC unit 100. In addition, a third row passenger seat 102 is mounted to the sheet metal floor component 20 adjacent the floor opening 22 and adjacent the rear HVAC unit 100 in the non-hybrid electric vehicle configuration 19. In an aspect, an HVAC coolant delivery coupling 120 and an HVAC coolant return coupling 122 extends through the floor opening 22 from a bottom of the rear HVAC unit 100 in the non-hybrid electric vehicle configuration 19. Thus, coolant is provided to and from the rear HVAC unit 100 within the interior cabin from a coolant source outside the cabin via the exterior underbody.

The alternative exemplary coupling plate embodiments of FIGS. 11-14 are generally similar to that of the coupling plate embodiment described above. Accordingly, identical reference numbers are used in this embodiment to avoid unnecessarily duplicating the discussion above regarding these common elements. Unlike the prior embodiment, the single-piece integrally-molded thermoplastic coupling seal plates 24 of these embodiments each additionally include a battery vent nipple 106 that forms a vent passage 108 through the single-piece coupling seal plate 24.

Figure 11:
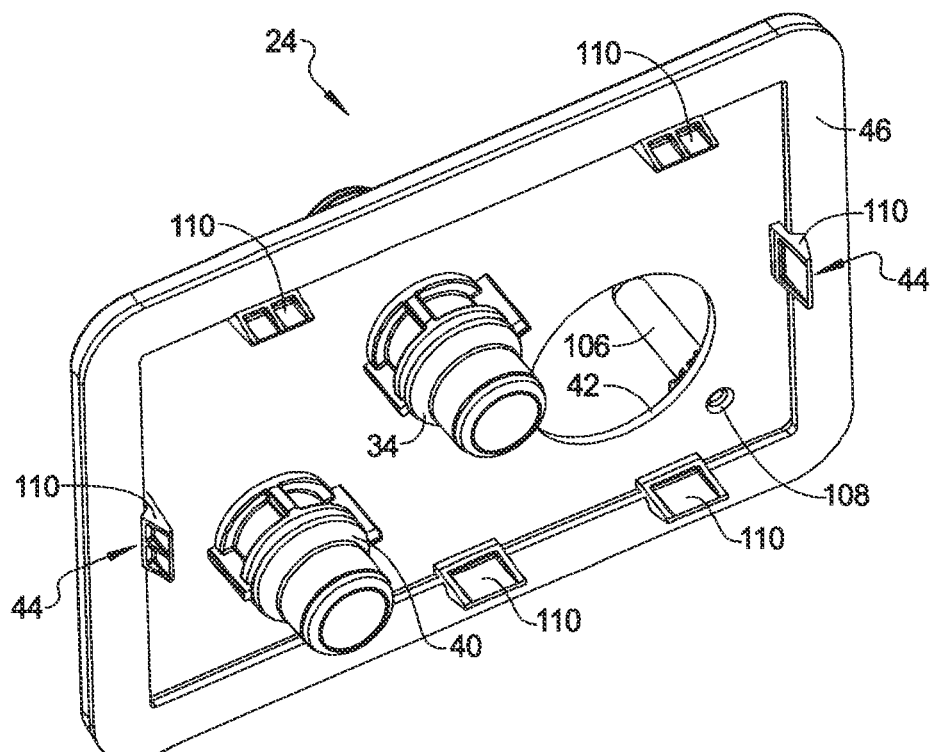
FIG. 11 is a lower perspective view of an alternative exemplary seal plate.
Figure 12:
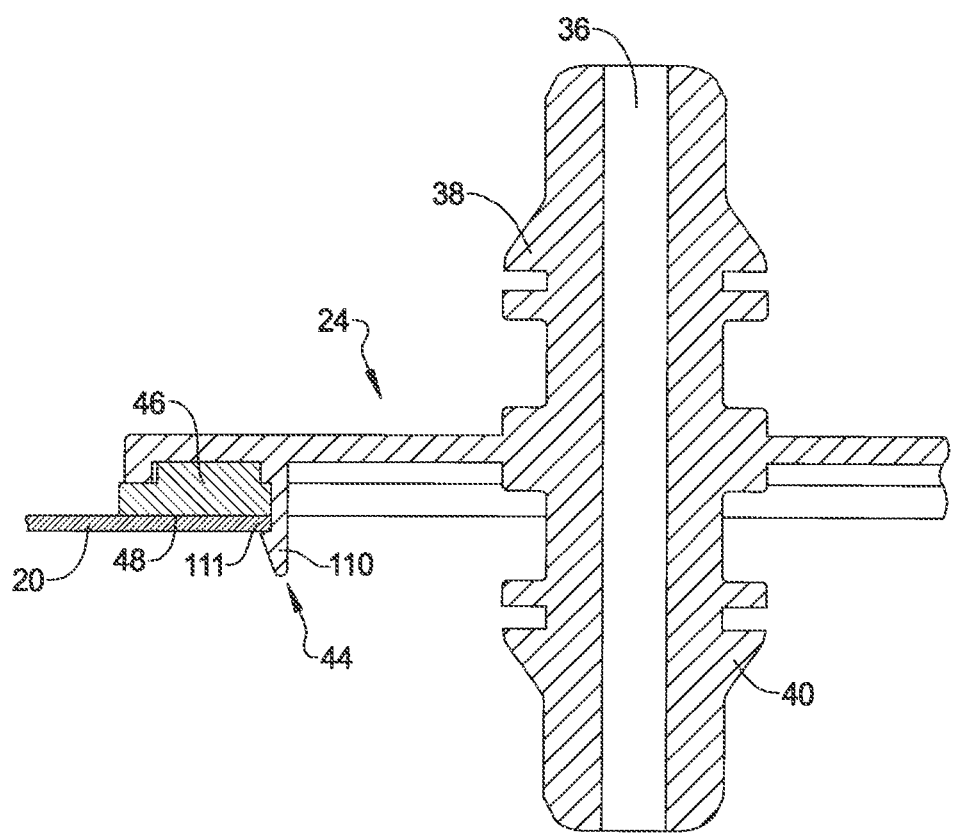
FIG. 12 is a partial cross-sectional view similar to FIG. 10 of the alternative exemplary seal plate of FIG. 11.

In the alternative exemplary coupling plate embodiment 24 of FIGS. 11 and 12, the floor-plate coupling elements 44 of the single-piece integrally-molded thermoplastic coupling seal plate 24 are flexible thermoplastic clips 110. The flexible clips 110 engage against the floor component 20 adjacent the floor opening 22 to sealingly couple the seal plate 24 to the sheet metal floor component 20 in the hybrid electric vehicle configuration 18. Specifically, the flexible thermoplastic clips 110 engage and act against a periphery 111 of the floor opening 22.

Figure 13:
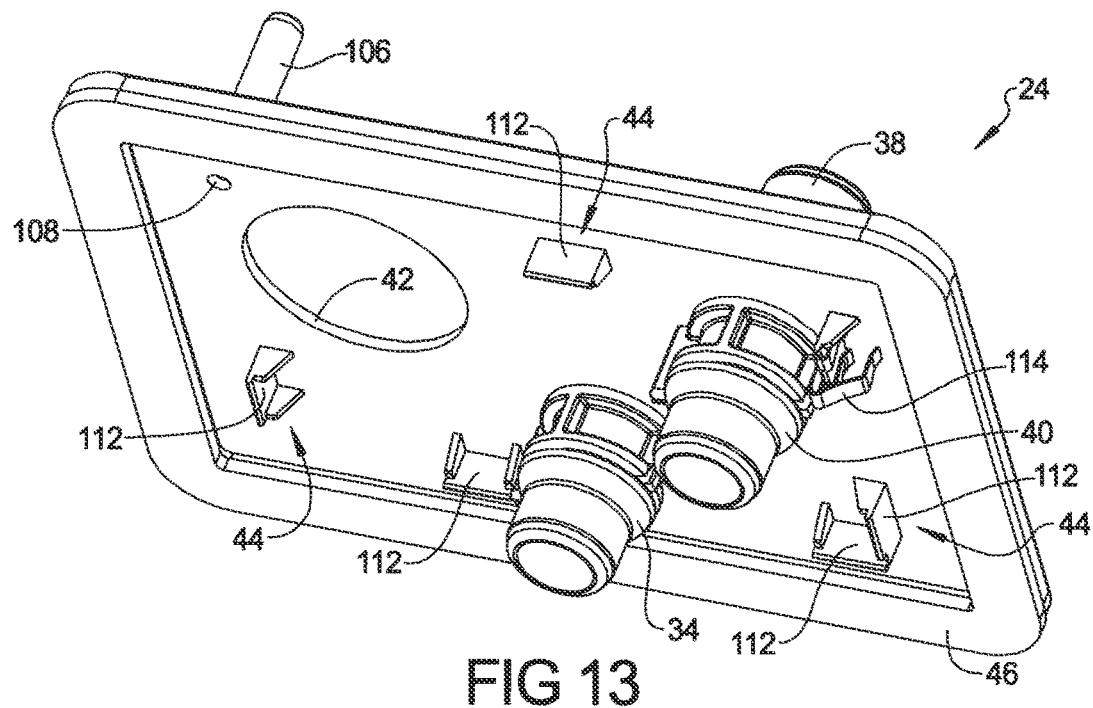
FIG. 13 is a lower perspective view similar to FIG. 11 of another alternative exemplary seal plate.
Figure 14:
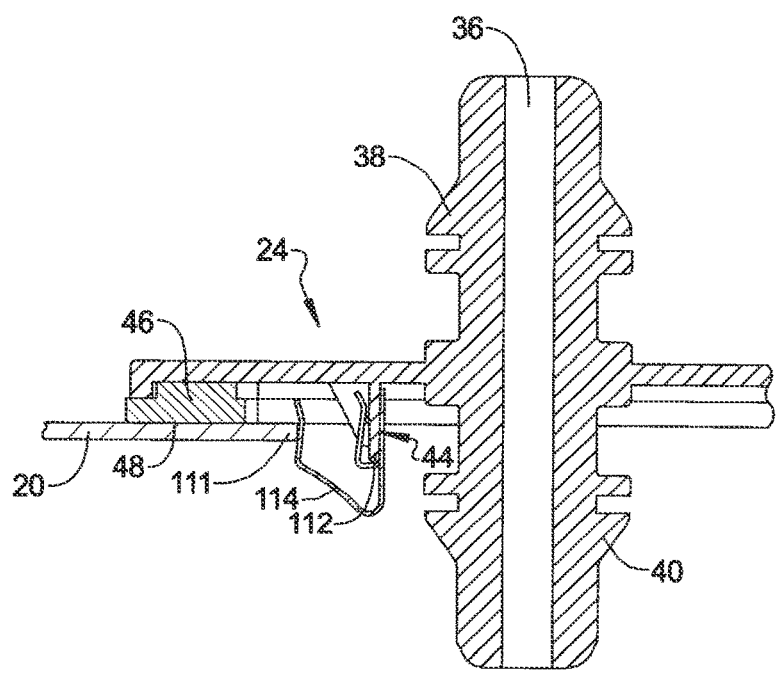
FIG. 14 is a partial cross-sectional view similar to FIG. 10 of the alternative exemplary seal plate of FIG. 13 and related coupling components.

In the alternative exemplary coupling plate embodiment 24 of FIGS. 13 and 14, the floor-plate coupling elements 44 of the single-piece integrally-molded thermoplastic coupling seal plate 24 are ribs 112. Separate, flexible metal clips 114 are mounted on the ribs 112 and engage and act against a periphery 111 of the floor opening 22 to sealingly couple the seal plate 24 to the sheet metal floor component 20 in the hybrid electric vehicle configuration 18.

Figure 15:
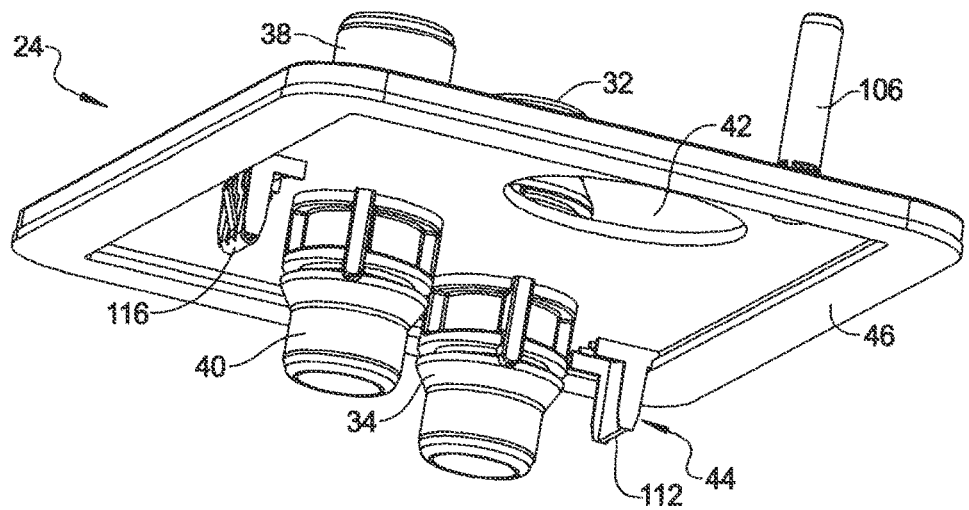
FIG. 15 is a lower perspective view similar to FIG. 11 of yet another alternative exemplary seal plate.
Figure 16:
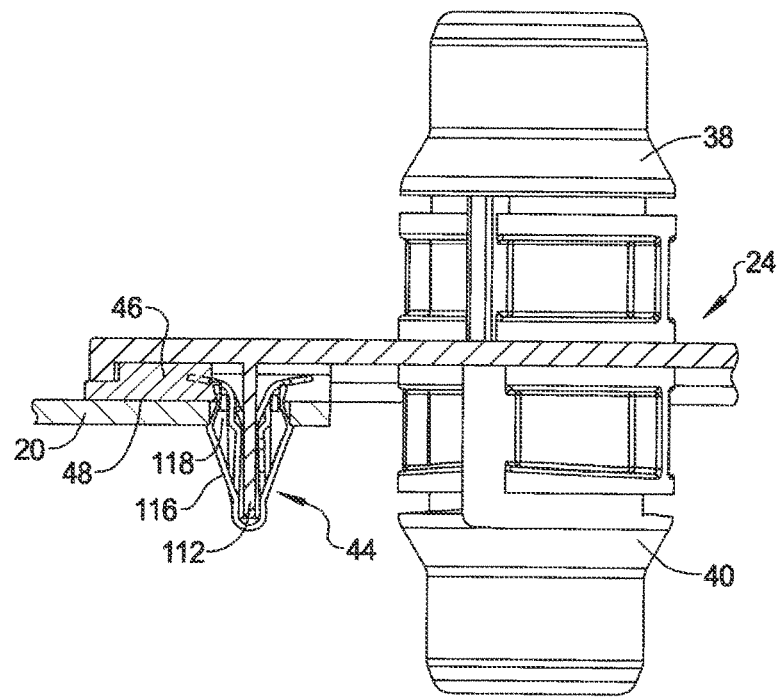
FIG. 16 is a partial cross-sectional view similar to FIG. 10 of the alternative exemplary seal plate of FIG. 15 and related coupling components.

In the alternative exemplary coupling plate embodiment 24 of FIGS. 15 and 16, the floor-plate coupling elements 44 of the single-piece integrally-molded thermoplastic coupling seal plate 24 are ribs 112. Alternative, separate, flexible metal clips 116 are mounted on the ribs 112. Clip openings 118 are provided in the floor component 20 adjacent the floor opening 22. These flexible metal clips 116 extend into and engage against the periphery of the clip openings 118 in the floor component 20 adjacent the floor opening 22 to sealingly couple the seal plate 24 to the sheet metal floor component 20 in the hybrid electric vehicle configuration 18.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A dual configuration automobile floor assembly comprising:
    a sheet metal floor component separating an exterior underbody of the automobile from the interior cabin of the automobile and having a floor opening extending between the exterior underbody and the interior cabin;
    a hybrid electric vehicle configuration comprising:
        a single-piece integrally-molded thermoplastic coupling seal plate having an interior and exterior side and including (1) a coolant delivery passage extending through the coupling seal plate and having an interior and an exterior quick-connect coolant delivery coupling at respective ends of the coolant delivery passage, (2) a coolant return passage extending through the coupling seal plate with an interior and an exterior quick-connect coolant return coupling at respective ends of the coolant return passage, (3) an electrical harness opening through the coupling seal plate, and (4) floor-plate coupling elements;
        a plate gasket positioned around an interior side of the floor opening between the coupling seal plate and the sheet metal floor component;
        wherein the coupling seal plate is mounted to the sheet metal floor component in the hybrid electric vehicle configuration via the floor-plate coupling elements and is sealed around the floor opening via the plate gasket; and a non-hybrid electric vehicle configuration comprising:
an operating unit;
an operating unit gasket positioned around an interior side of the floor opening between the operating unit and the sheet metal floor component;
wherein the operating unit is mounted on the sheet metal floor component in the non-hybrid electric vehicle configuration and is sealed around the floor opening via the operating unit gasket.

2. The dual configuration automobile floor assembly of claim 1, wherein the hybrid electric vehicle configuration further comprises an electrical harness grommet mounted in and sealing the electrical harness passage with an electrical harness passing therethrough.

3. The dual configuration automobile floor assembly of claim 1, wherein the quick connect coolant delivery couplings include coolant delivery key elements comprising delivery recesses, protrusions or both, and the quick connect coolant return couplings include coolant return key elements comprising return recesses, protrusions or both, and wherein the delivery and return key elements are incompatible, preventing a coolant delivery hose coupling from being coupled to the quick connect coolant return couplings and vice versa.

4. The dual configuration automobile floor assembly of claim 3, wherein the hybrid electric vehicle configuration further comprises:
an exterior coolant delivery hose having a cooperating quick connect delivery coupling coupled to the exterior quick connect coolant delivery coupling of the coupling seal plate with cooperating coolant delivery key elements matingly engaged with the coolant delivery key elements;
an interior coolant delivery hose having a cooperating quick connect delivery coupling coupled to the interior quick connect coolant delivery coupling of the coupling seal plate with cooperating coolant delivery key elements matingly engaged with the coolant delivery key elements;
an exterior coolant return hose having a cooperating quick connect return coupling coupled to the exterior quick connect coolant return coupling of the coupling seal plate with cooperating coolant return key elements matingly engaged with the coolant return key elements; and
an interior coolant return hose having a cooperating quick connect coupling coupled to the interior quick connect coolant return coupling of the coupling seal plate with cooperating coolant return key elements matingly engaged with the coolant return key elements.

5. The dual configuration automobile floor assembly of claim 1, wherein the operating unit of the non-hybrid electric vehicle configuration is a rear HVAC unit.

6. The dual configuration automobile floor assembly of claim 5, wherein an HVAC coolant delivery coupling and an HVAC coolant return coupling extends through the floor opening from a bottom of the rear HVAC unit in the non-hybrid electric vehicle configuration, and wherein coolant is provided to and from the HVAC unit through the floor opening via the HVAC coolant delivery and return couplings, respectively.

7. The dual configuration automobile floor assembly of claim 6, wherein a third row passenger seat is mounted to the sheet metal floor component adjacent the floor opening in the non-hybrid electric vehicle configuration.

8. The dual configuration automobile floor assembly of claim 7, wherein a hybrid electric vehicle battery is mounted to the sheet metal floor component adjacent the floor opening in the hybrid electric vehicle configuration, and wherein coolant is provided to and from the hybrid electric vehicle battery through the floor opening via the coolant delivery and return passages, respectively, of the coupling seal plate.

9. The dual configuration automobile floor assembly of claim 1, wherein the floor-plate coupling elements of the single-piece integrally-molded thermoplastic coupling seal plate comprise a plurality of lateral extensions with fastener apertures extending therethrough, and wherein threaded fasteners extend through the fastener apertures in the hybrid electric vehicle configuration.

10. The dual configuration automobile floor assembly of claim 1, wherein the floor-plate coupling elements of the single-piece integrally-molded thermoplastic coupling seal plate comprise flexible thermoplastic clips, and wherein the flexible clips engage against the sheet metal floor component to sealingly couple the coupling seal plate to the sheet metal floor component in the hybrid electric vehicle configuration.

11. The dual configuration automobile floor assembly of claim 1, wherein the floor-plate coupling elements of the single-piece integrally-molded thermoplastic coupling seal plate comprise ribs, and wherein flexible metal clips are mounted on the ribs that engage against the sheet metal floor component to sealingly couple the coupling seal plate to the sheet metal floor component in the hybrid electric vehicle configuration.

12. The dual configuration automobile floor assembly of claim 1, wherein the single-piece integrally-molded thermoplastic coupling seal plate further comprises a battery vent nipple forming a vent passage through the coupling seal plate.

* * * * *